United States Patent [19]

Mas

[11] 4,394,597

[45] Jul. 19, 1983

[54] MULTIPLE POLE AXIAL FIELD ELECTROMAGNETIC DEVICES

[75] Inventor: Joseph A. Mas, Morristown, N.J.

[73] Assignee: Allied Corporation, Morris Township, Morris County, N.J.

[21] Appl. No.: 187,244

[22] Filed: Sep. 15, 1980

[51] Int. Cl.³ .............................................. H02K 1/22
[52] U.S. Cl. ..................................................... 310/268
[58] Field of Search .............................. 310/216–218, 310/268

[56] References Cited

U.S. PATENT DOCUMENTS

| | | | |
|---|---|---|---|
| 1,605,796 | 11/1926 | Tanzler . | |
| 2,356,972 | 8/1944 | Chubbuck | 171/252 |
| 2,438,629 | 3/1948 | Anderson | 171/252 |
| 2,469,808 | 5/1949 | Aske | 172/120 |
| 2,550,571 | 4/1951 | Litman | 172/120 |
| 3,567,978 | 3/1971 | Parker | 310/268 |
| 3,591,819 | 7/1971 | Laing | 310/217 |
| 4,187,128 | 2/1980 | Billings et al. | 148/121 |
| 4,187,441 | 2/1980 | Oney | 310/268 X |

FOREIGN PATENT DOCUMENTS

| | | |
|---|---|---|
| 832452 | 2/1952 | Fed. Rep. of Germany . |
| 950016 | 10/1956 | Fed. Rep. of Germany . |
| 1107737 | of 0000 | France . |
| 1527434 | 6/1967 | France . |
| 808533 | 8/1956 | United Kingdom . |
| 888685 | of 0000 | United Kingdom . |
| 1548124 | 2/1978 | United Kingdom . |

*Primary Examiner*—Donovan F. Duggan
*Attorney, Agent, or Firm*—Gerhard H. Fuchs; Roy H. Massengill; Paul Yee

[57] ABSTRACT

In accordance with the teachings of the present invention, a core element is provided for the rotor or stator of an axial field electromagnetic device such as a motor or generator. The core element of the present invention comprises a cylinder of annular cross section having two annular faces, an axial thickness separating the faces and a plurality of radial slots in one of the faces. In accordance with the present invention, the dimensions of the core element and the slots thereof are sized according to a predetermined relationship. As a result, an electromagnetic device utilizing the core elements of the present invention is more energy efficient, cheaper and lighter relative to electromagnetic devices of the prior art.

46 Claims, 10 Drawing Figures

MULTIPLE POLE AXIAL FIELD ELECTROMAGNETIC DEVICES

FIELD OF THE INVENTION

The present invention relates to multiple pole, axial field electromagnetic devices such as motors and generators, and more particularly to such devices in which the rotor and/or stator is formed from cylindrical core elements of annular cross-section having radial slots adapted to receive windings and/or conductors therein.

BACKGROUND OF THE INVENTION

Electric devices such as motors and generators are frequently classified according to the orientation of the lines of flux between the stationary and rotating elements. Thus, electrical generators and motors are often referred to as radial or axial field devices. Although radial field devices are in widespread use, axial field devices have been viewed as being of limited utility. The major reason for this is that heretofore axial field devices generally exhibited a low efficiency and required massive structure to achieve desired power capacities. Hence, radial field designs were generally preferred.

Prior art designs for axial field motors or the like as exemplified by U.S. Pat. No. 2,469,808, which issued to L. E. Aske on May 10, 1949, were generally of a pancake design and generally manifested low volumnmetric efficiency. Therefore, cores losses which include eddy current and hysteresis losses are substantial and greatly contribute to the overall inefficiency of the motor design. In U.S. Pat. No. 2,469,808, an open-face caged rotor induction motor of the pancake type is disclosed. The core of the motor comprises a flat annular ring formed from a tight, spirally wound strip of electrical steel ribbon. Other examples of motors of this type are disclosed in U.S. Pat. No. 3,591,819, which issued to Laing on July 6, 1979, and U.S. Pat. No. 2,356,972, which issued to Chubbuck on Aug. 29, 1944. Axial field motors exhibiting pancake design features generally manifested notoriously low volumnmetric efficiency and hence, high losses. Examples of axial field motors employing multiple rotor or stator designs are also set forth in U.S. Pat. No. 2,557,249 and 2,550,571 as issued to L. E. Aske on June 19, 1951 and B. Littman on Apr. 24, 1951, respectively.

The present invention proceeds upon a recognition and determination that marked improvements in the efficiency of axial field motors can be obtained by wholly rejecting the pancake-like design considerations prevailing in the prior art and instead adopting near square, optimized proportions so that by stacking rotors and stators, any desired geometry may be achieved without a substantial decrease in performance. Thus, in accordance with the present invention, the core element forming either the rotor or the stator, generally comprises a cylinder having an annular cross-section made of iron or the like. This core element is slotted and configured such that the sum of the slot widths per pole preferably equals approximately 60% of the axial length of the core element; the slot depth preferably equals approximately 60% of the axial length; and the total slot area (slot length×slot width×number of slots) preferably equals approximately 75% of the area of the iron cylinder less the area of the slots.

In addition to the marked efficiency improvement with core designs in accordance with the present invention, the weight of the core elements so designed and hence the overall structure of the resulting motor or generator may be minimized for a desired power capacity. As a result, a motor constructed in accordance with the teachings of the present invention will be lighter and hence more cost efficient than prior art axial field devices due to a marked reduction in material requirements.

Furthermore, while the core designs set forth herein may be formed of silicon, iron or similar conventional materials, efficiency is here additionally enhanced by markedly reducing hysteresis and eddy current losses by forming the core elements from a wound strip of an amorphous magnetic alloy rather than a wound strip of electrical steel as typically employed in the prior art. The high electrical resistivity of such amorphous magnetic alloys, which range from approximately 160 to 180 microhms/cm at 25° C., results in a substantial decrease in eddy current losses, while the lower coercivity thereof markedly lowers hysteresis losses. In combination core losses exhibited by cores formed from amorphous magnetic alloys as employed herein have been found to be only one-seventh of those manifested by similarly configured cores formed of conventional materials. In this regard, it should be noted that while use of amorphous magnetic alloys has previously been suggested for the purpose of reducing losses in radial field devices, mechanical forming problems associated with the stampings required in radial field devices, have precluded the practical application of these materials to prevent such losses. Amorphous magnetic alloys are, however, readily available in strip or tape form which readily admit of winding to form the cylindrical cores employed within the instant invention.

SUMMARY OF THE INVENTION

The present invention provides, in a preferred exemplary embodiment, an electromagnetic device including a core element comprising a cylinder of annular cross section having two opposed annular faces and an axial thickness separating the faces. The core element is provided with a plurality of radial slots disposed in one of the annular faces. The overall dimensions of the core element and its slots are designed according to a predetermined relationship. For example, the slots can be sized such that the sum of the slot widths per pole is between approximately 30% to approximately 90% of the axial thickness; the slot depth is between approximately 45% to approximately 75% of the axial thickness; and the total slot area is between approximately 27% to approximately 180% of the difference between the annular cross-sectional area of the core elements and the total slot area.

In an optimized, preferred embodiment, the sum of the slot widths per pole may advantageously be approximately 60% of the axial thickness; and the depth of the slots may preferably be approximately 60% of the axial thickness. Additionally, the total slot area may preferably approximate 75% of the difference between the annular cross-sectional area of the core element and the total slot area, as aforesaid. An axial field motor comprising a rotor and a stator incorporating core elements fabricated in accordance with the above-described variables will be optimized for any chosen power capacity in that maximum power capacity per unit volume will obtain. As a result, such a motor is more energy efficient when contrasted with the motors designed according to prior art techniques. Additionally, since the volume of material utilized in forming the core may be optimized to be at a minimum for a maximum power capacity, the optimized core design of the present invention results in an axial field device which is cheaper and lighter than prior art axial field devices having conventional core designs.

As yet another aspect of the preferred embodiment, the cylinder of annular cross section can be formed from a spirally wound strip of magnetically permeable material. For example, the magnetically permeable material can comprise a metallic alloy that is at least 50% amorphous and has a composition defined by the formula $M_{60-90} T_{0-15} X_{10-25}$. In accordance with the formula, M is a ferromagnetic material composed of at least one of the elements of iron, cobalt and nickel, T is at least one of the transition metals and X is at least one of the metalloid elements of phosphorous, boron and carbon.

Alternatively and as another form of core construction up to about 80% of the component X can be replaced by one of aluminum, antimony, beryllium, germanium, indium, silicon and tin. The amorphous alloy can also be varied to be at least 80% amorphous and in yet another variation the amorphous alloy can be at least about 95% amorphous.

A core element constructed from an amorphous material, such as described hereinabove, results in a core which exhibits about 1/10th to about 1/36th of the electrical losses present in cores formed from electrical steel.

BRIEF DESCRIPTION OF THE DRAWINGS

The invention will now be described with reference to the accompanying drawings, in which:

FIGS. 5A–5D illustrate additional exemplary embodiments of electrical devices according to the present invention wherein

FIGS. 6A and 6B illustrate additional exemplary embodiments of the present invention wherein

DETAILED DESCRIPTION

Figure 1:
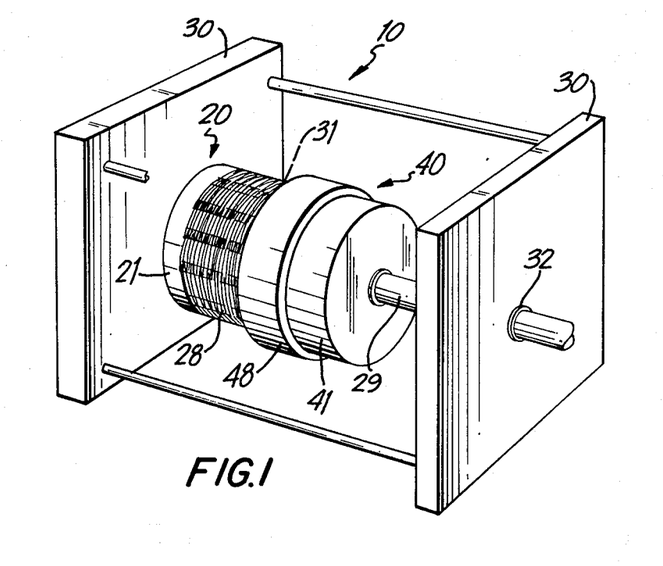
FIG. 1 is a perspective schematic view of an exemplary electrical device according to the present invention.
Figures 2, 3:
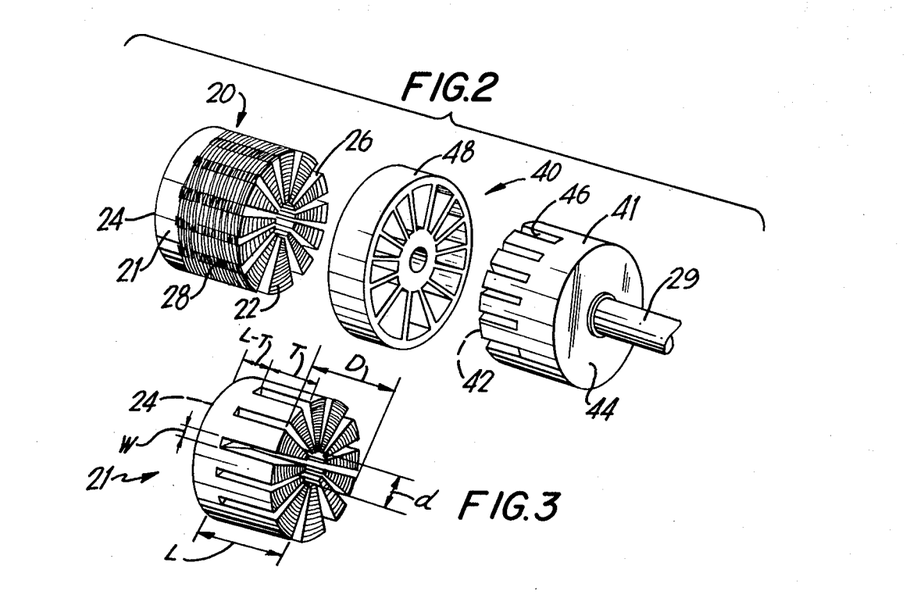
FIG. 2 is an exploded perspective schematic view of the device shown in FIG. 1 illustrating the relationship of certain portions of the exemplary electromagnetic device.
FIG. 3 is a perspective view showing the details of an exemplary core element utilized in forming the stator of the electrical device illustrated in FIG. 1.

Referring now to FIGS. 1 and 2, the exemplary electromagnetic device 10 illustrated generally comprises a stator 20 fixedly connected to a frame 30 and a rotor 40 mounted on a shaft 29 which is rotatably mounted in a bearing 32 journaled in frame 30. The rotor 40 and the stator 20 are mounted on frame 30 so that an air gap 31 is formed therebetween.

Stator 20, as best shown in FIG. 2, comprises a first core element 21 which may take the form of a cylinder of annular cross-section having two opposed annular faces 22 and 24. The annular face 22 is provided with a plurality of slots 26 for receiving windings 28 therein. Rotor 40 comprises a similar second core element 41 having two opposed annular faces 42 and 44. The annular face 42 has a plurality of radial slots 46 for receiving conductor elements therein. As can be seen in FIG. 2, the conductor elements for the rotor 40 in the illustrated embodiment take the form of a spider 48. The spider functions as a shorted secondary which produces a magnetic field which is induced by a magnetic field provided in the winding 28. The two fields act in opposition to create a force to spin the rotor 40. Although spider 48 is illustrated in the form of a one piece cast component, the spider could be formed from a plurality of stacked stampings. Moreover, although not illustrated, instead of the spider 48, a wound rotor employing windings, a slip ring and resistors shorting the windings could be utilized. The core elements for the stator 20 and the rotor 40 may be formed in a similar manner from a spirally wound strip of material as described in connection with FIG. 3.

As illustrated, in FIG. 2, the exemplary stator 20 may be provided with twelve to fourteen slots for receiving windings 28. However, the number of slots employed may be varied as a function of design parameters, it being noted a relatively large number of slots is generally preferred. In the preferred embodiment, the windings are configured in a manner well known in the art to produce a 4-pole axial field induction motor which may be powered by a three-phase electric current source, not shown. As such, for the twelve slot stator 20 illustrated, there are provided three slots per pole and one slot per phase. Thus for each pole, each winding loops around three of the slots 26 with a winding corresponding to a phase offset by one slot from the previous winding corresponding to the previous phase. As such, in a manner well known in the art, for each phase and for each pole, each winding loops around three of the slots 26 with each winding offset one slot from the previous winding. As can well be appreciated, conventional copper windings may be employed and other slot and winding configurations could be utilized depending upon the number of phases, poles, etc.

The rotor 40 should generally be sized equally with the stator for the exemplary embodiment here being discussed. This assumes equal space utilization, however, and where the same does not obtain, as shall be seen below, calculations based upon the rotor being a mirror image of the stator are first made for purposes of obtaining slot width and depth and, thereafter, total axial length of the device is then divided between the stator and rotor to achieve equal space utilization. However, the number of slots 46 present in the rotor 40 should preferably be greater than the number of slots 26 present in the stator 20. The reason for the different number of slots is to prevent cogging effects. Therefore, for example, if the stator has twelve slots 26, the rotor should preferably have fourteen slots 46. The slots 46 are sized to receive, in the case of an induction-type electrical motor, a plurality of shorted conductors which can take the form of a spider 48, as aforesaid, or alternatively other conventional shorted conductor configurations may be employed. Furthermore, the spider 48 may be formed of copper, aluminum or other forms of conventional conducting material, however, due to the higher packing factor of the solid, uninsulated spider, the percent of the total slot space occupied by the spider may vary from that occupied by the stator to achieve equal utilization. Thus, while in a wound rotor design where both the stator and rotor employ insulated copper on insulated slots and have the same space utilization, slot space will be equally shared, in a design employing a "cage" rotor, slot space may be shared to achieve equal space utilization. For instance, if a solid, uninsulated copper spider is employed, only approximately thirty percent of the slot space need be utilized for the spider leaving some seventy percent of the slot space for the stator. However, where an aluminum spider is employed, the higher resistivity thereof will require that approximately forty-eight percent of the slot space be utilized for the spider leaving approximately fifty-two percent of the slot space for the stator.

Referring now to FIG. 3, there is illustrated the details of core element 21 as utilized in forming the stator 20 and it will be appreciated by those of ordinary skill in the art that the rotor 40 may be configured in a similar manner. The core element 21 may be formed by a spirally wound strip of magnetically permeable material having a width L. When the strip is spirally wound into a cylindrical configuration as shown, the resulting core element has a stator length or axial thickness L as measured between the opposed annular faces 22 and 24; an outer diameter D; and inner diameter d; a slot depth T, a return path space equal to L−T; and a slot width W all as shown in FIG. 3. Furthermore, although not shown in FIG. 3, the rotor may be assumed to be a mirror image of the stator and have similar dimensions.

In accordance with the present invention, two core elements 21 and 41 are provided for in an inductive device in which the critical dimensions of the outer and inner diameters D and d; the axial thickness L, the slot depth T and the slot width W are optimized for maximum power capacity per unit volume. As will be discussed in more detail hereinafter, the optimized core elements 21 and 41 according to the preferred embodiment incorporate slots sized such that the sum of the slot widths per pole is equal to approximately 60% of the stator length and the depth of each of the slots is equal to approximately 60% of the stator length under conditions where it is assumed that the axial length of the stator and rotor are equal. Additionally, the total slot area (slot length × slot width × the number of slots) is sized such that the total slot area is equal to about 75% of the quantity defined by the difference between the annular cross-sectional area of the core element $(\pi D^2/4)-(\pi d^2/4)$ and the total slot area.

A core element for an electromagnetic device which does not incorporate the optimum slot dimensions and area ratios of the core elements set forth above will not exhibit the same power capacity of a core element of the present invention for the same volume of core material. Hence, the dimensions of such a core element are less than optimum and will require much more material than would otherwise be necessary.

The aforementioned dimensional quantities are derivable by optimizing the power capacity, "PC" for a minimum volume of core material "V". Optimization may be performed empirically and may be based on the fact that it is possible to determine the power capacity of an electromagnetic machine by spinning a stator or a rotor in an air flux density $B_A$ at a speed S and measuring the induced voltage in the windings. The power capacity can then be expressed as being equal to $E^2/R$ where E represents the induced voltage in the windings and R represents the resistance of the windings. The induced voltage is governed by the formula:

$$E = KfBNA_c \tag{1}$$

where B equals the iron flux density; $A_c$ is the net pole area, N equals the number of turns in the net pole area $A_c$, f equals the frequency of the flux change or voltage change (a function of rotational speed S in a motor or generator, respectively) and K equals a dimensional constant. The net pole area $A_c$ is equal to the difference between the annular cross-sectional area of the core element and the total slot area divided by the number of poles. If the inner diameter d is set equal to PD and the slot width W is set equal to sD, (where P is the ratio between the inner diameter d and the outer diameter D and S=W/D) and the number of poles is equal to 4, then the net pole area $A_c$ can be expressed as:

$$\frac{1}{4}\left[\frac{\pi D^2}{4} - \frac{\pi P^2 D^2}{4} - \frac{nsD \times D(1-P)}{2}\right] \tag{2}$$

where n is equal to the number of slots and ¼ represents a 4-pole machine in what is otherwise a general derivation.

Equation 2 can be simplified by expressing $A_c$ as equal to: $D^2(A-SC)$ where A equals $(\pi/16)(1-P^2)$ and C equals $(n/8)(1-P)$.

The resistance R of the windings is proportional to the length of the windings divided by the thickness of the windings. The length of the windings is equal to N×mlt; where n is equal to the number of turns and mlt is equal to the mean length turn. The mean length turn, mlt can be expressed as:

$$(\pi D/4)+(\pi PD/4)+D(1-P) \tag{3}$$

The thickness of the wire is equal to $A_w/N$. If the flux return path L−T is set equal to rD where $r=(L-T)/D$ and the slot depth dimension T is set equal to mrD where $m=T/rD$, then $A_w$ can be expressed as being equal to $smrD^2$ (slot width x slot depth).

If mlt is expressed as FD, where:

$$F = \pi/4 + (\pi P/4) + (1-P)$$

the power capacity $E^2/R$ can be expressed as being proportional to:

$$\frac{B^2 f^2 D^5 (A-sC)^2 smr}{F} \tag{4}$$

Since the object of the analysis is to optimize the volume of core elements with identical power capacities but varying geometries, equation 4 can be set equal to unity and rewritten in terms of $D^5$:

$$D^5 = \frac{F}{B^2 f^2 (A - sC)^2 smr} \tag{5}$$

In multiple pole electromagnetic machines, the flux flowing into or out of a pole splits into two halves with one half flowing through the return space expressed herein as rD and the other half flowing into an adjacent polarity pole. The area of the return space is rD times the width of the pole of $\frac{1}{4}D(1-P)$. For uniform flux density, this area should equal the net pole area $A_c$ of one-half of a pole or:

$$\tfrac{1}{4} rD^2 (1-P) = \tfrac{1}{2}(A-sC)D^2 \tag{6}$$

r therefore equals:

$$\frac{A - sC}{1 - P} \tag{7}$$

Substituting equation 7 into equation 5:

$$D^5 = \frac{F(1 - P)}{B^2 f^2 (A - sC)^3 sm} \tag{8}$$

The core element volume "V" is proportional to $D^2L$ since L is equal to the sum of the slot depth mrD and the return space rD; V can be expressed as being proportional to:

$$D^3 r(m+1) \tag{9}$$

from equation 8:

$$D^3 = \frac{F^{.6}(1 - P)^{.6}}{B^{1.2} f^{1.2} (A - sC)^{1.8} s^{.6} m^{.6}} \tag{10}$$

Substituting for r (equation 7) in equation 9:

$$V = \frac{D^3(A - sC)m + 1}{1 - P} \tag{11}$$

Therefore:

$$V = \frac{F^{.6}(m + 1)}{B^{1.2} f^{1.2} (A - sC)^{.8} s^{.6} m^{.6} (1 - P)^{.4}} \tag{12}$$

It is evident from inspection of equation 12 that the volume for constant power capacity will vary with s and m. Since these are independent variables, one can be held constant as the other is varied. Thus, equation 18 can be partially differentiated in order to determine the optimum values for these variables. Thus, where $\partial V/\partial s = 0$:

$$s = \frac{.6A}{1.4C} = .4286 \frac{A}{C} \tag{13}$$

Substituting A and C from Equation 2 into equation 13:

$$s = \frac{.6732(1 - P)}{n} \tag{14}$$

where n equals the number of slots.

A similar substitution for A and C can be made in equation 7:

$$r = 0.1122 (1 - P) \tag{15}$$

In a manner similar to that set forth above the optimum value of m is found to be 1.5.

Thus optimum values for slot width, slot depth, stator length and return space can be expressed as follows:

Slot width $= W = sD = \dfrac{.6732}{n} (1 + P)D$  (16)

Slot depth $= T = mrD = .1683(1 + P)D$  (17)
Stator Length $= L = (m + 1)rD = .2805(1 + P)D$  (18)
Return space $= L - T = rD = .1122(1 + P)D$  (19)

Substituting L in equation 16 and dividing both sides by 4 (the number of poles utilized in the foregoing analysis, note equation 2), it can be seen that optimally, the sum of the slot widths per pole is equal to about 60% of the length or axial thickness of the core element. A substitution for L in equation 17 reveals that the depth of the slots is optimally equal to about 60% of the length or axial thickness of the core element. Substituting the optimum value of s, which is equal to 0.6A/1.4C in an expression for the ratio of the total slot area to the area of one of the annular faces less the total slot area or $$\frac{CD^2}{D^2(A - sC)},$$

it can be seen that the ratio of areas is optimally equal to about 0.75. Once the inner diameter and the length or axial thickness L of the core element are chosen, these aforementioned quantities completely define the optimized core elements of the present invention. This can be demonstrated by expressing the foregoing area ratio as a function of D, d and N and sD, where n equals the number of slots, and sD equals the slot width, and solving for D:

$$\frac{\text{total slot area}}{\text{annular area of core element} - \text{total slot area}} = .75$$

$$\frac{n \frac{D - d}{2} sD}{\frac{\pi D^2}{4} - \frac{\pi d^2}{4} - n \frac{(D - d)}{2} sD} = .75$$

$$n \frac{D - d}{2} sD =$$

$$.75 \left[ \pi \left( \frac{D - d}{2} \cdot \frac{D + d}{2} \right) - n \left( \frac{D - d}{2} \right) sD \right]$$

$$D = 2 \frac{1.75 nsD}{.75\pi} - d$$

With reference to equation 16, sD optimally for a 12 slot, 4-pole machine is equal to 0.2L.
Therefore:

$$D = 3.565L - d$$

While this analysis has been conducted with respect to the stator the same development and results, as will now be appreciated by those of ordinary skill in the art, will obtain for the rotor, if it is assumed that the same is a mirror image of the stator. This assumption, however, while often not accurate, is always applied in these calculations when variations in axial core lengths are made to accomodate winding and space utilization.

By way of an exmple, if the inner diameter d of a core element having a length or axial thickness of 2" is chosen to be 2.3" than the optimal outer diameter of a core element of the present invention is 4.83". Additionally, it should be mentioned that if the outer diameter is held constant and the slot depth and the slot width are varied, it can be demonstrated that, as the slot width, slot depth and the area ratio are varied, from the foregoing optimum values, the power capacity falls off rapidly.

The following chart represents the change in power capacity of a core element having an outer diameter of 4.83", an axial thickness of 2" and an inner diameter of 2.3" as slot depth is varied between 0.1" to 0.6". In deriving the chart, since D, d and L are constant, $A_c$ is a function of slot width. Also, since the return path area $$rD \times \frac{D}{2}(1 - P)$$

must equal $A_c/2$, then it can be seen that slot depth can be expressed as $$L - \frac{A_c}{D(1 - P)}.$$

Therefore, once the slot width is chosen, it can be seen that the slot depth can be determined in accordance with the foregoing.

Additionally, constants such as the iron flux density, rotational speed, etc., were neglected. The power capacities were normalized and the slot width and slot depths were expressed in terms of the axial thickness L.

30% to approximately 90% of the length or axial thickness, the slot depth would be between approximately 45% and 75% of the axial thickness or length and the As/Af ratio would equal between approximately 27% to approximately 180%. Similar ranges can be taken from the accompanying chart for power capacities of 80% and of 90% of the optimum.

Figure 4:
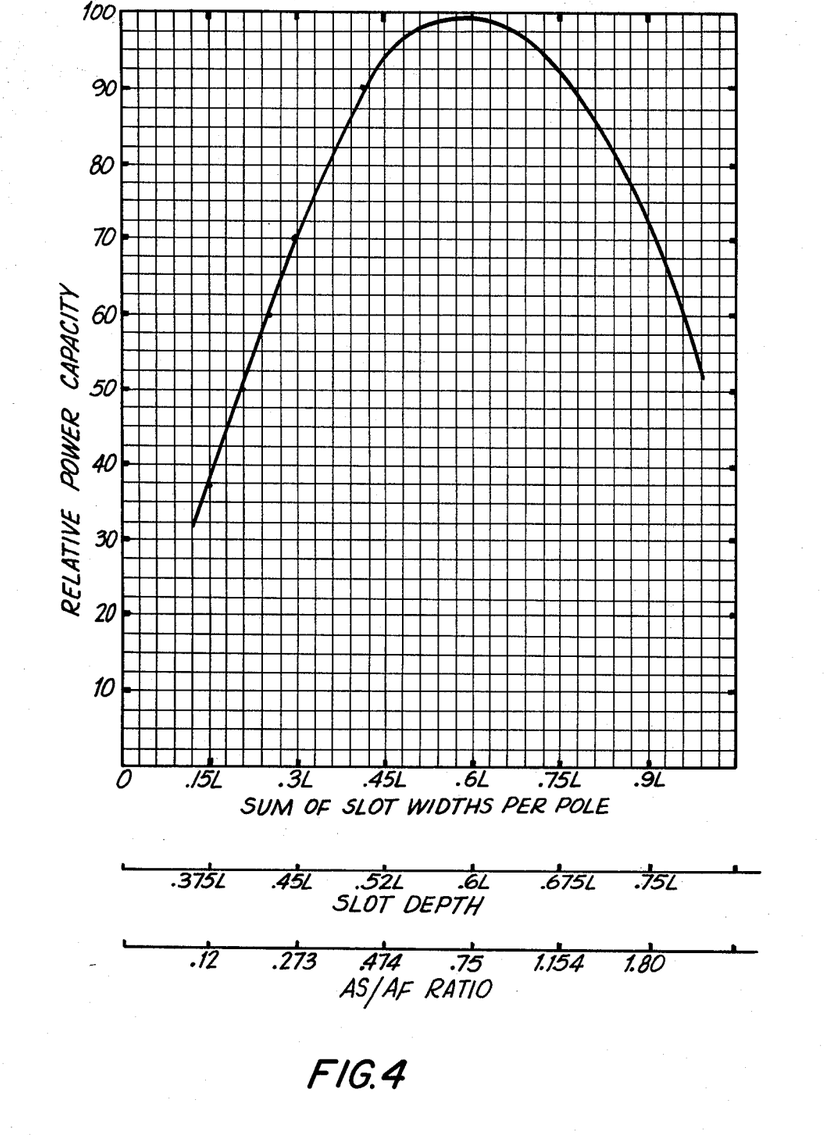
FIG. 4 is a graph of the power capacity versus the critical dimensions of an exemplary core element in accordance with the teachings of the present invention.

Since the slot width and slot depth are stated in terms of L and the power capacity is normalized by dividing the resultant power capacities by the maximum power capacity, the accompanying chart can serve as an aid in designing the slot configuration of core elements having the same volume for varying power capacity. This can be illustrated by way of an example: if a twelve slot core element for a 4-pole device is fabricated from a strip of magnetically permeable material having a width of 1" is considered and it is assumed that an inner diameter d of 1" is also to be employed. Under these conditions, in order to produce a core having an optimum power capacity per volume of material, the outer diameter D (from the relationship that $D = 3.565L - d$; for a 4-pole device) should be equal to 2.565", the slot width should be 0.2", (0.2L for a 12 slot, 4-pole device) and the slot depth should be 0.6". Referring to the chart and to FIG. 4, it can be seen that in order to produce a core element having a power capacity of 70% of the aforementioned optimized core element, the slot width should equal between approximately 30% to approximately 90% of the optimized value and the slot depth should equal between approximately 45% to approximately 75% of the optimized value.

To further enhance efficiency the core elements 21 and 41 forming the rotor and stator 20 and 40 described hereinabove may preferably be formed of a spirally wound strip composed of an amorphous (glassy) magnetic alloy. Such alloys evince a high electrical resistivity ranging from about 160 to about 180 microhms/cm at 25° C. depending upon the particular composition

| | | | EFFECT OF VARYING SLOT WIDTH (sD) WITH CONSTANT D & L | | | | | | |
|---|---|---|---|---|---|---|---|---|---|
| SLOT WIDTH (sd) | SUM OF SLOT WIDTHS/POLE AS A FUNCTION OF L | TOTAL SLOT AREA ($A_S$) | ANNULAR CROSS-SECTIONAL AREA LESS TOTAL SLOT AREA ($A_f$) | $A_S/A_f$ | $A_c$ | RETURN PATH (rD) | SLOT DEPTH (mrD) | SLOT DEPTH AS A FUNCTION OF L | $A_w$ | POWER CAPACITY (Normalized Pow-capacity) PC |
| .1 | .15L | 1.518 | 12.65 | .12 | 3.1625 | 1.25 | .75 | .375L | .075 | .750 (38.1) |
| .2 | .3L | 3.036 | 11.132 | .273 | 2.783 | 1.1 | .9 | .45L | .18 | 1.394 (70.9) |
| .3 | .45L | 4.554 | 9.614 | .474 | 2.404 | .95 | 1.05 | .525L | .315 | 1.820 (92.5) |
| .4 | .6L | 6.072 | 8.096 | .75 | 2.024 | .8 | 1.2 | .6L | .48 | 1.9664 (100) |
| .5 | .75L | 7.59 | 6.578 | 1.154 | 1.644 | .65 | 1.35 | .675L | .675 | 1.8255 (92.8) |
| .6 | .90L | 9.108 | 5.06 | 1.80 | 1.265 | .5 | 1.5 | .75L | .900 | 1.440 (73.2) |

FIG. 4 is a graph of the normalized power capacity versus the sum of the slot widths per pole, the slot depth and the As/Af ratio (the ratio of the total slot area to the annular cross-sectional area of a core element less the total slot area) as set forth in the foregoing chart. From FIG. 4, it can be seen that, as predicted by equation 16, a maximum occurs where the sum of the slot widths per pole and the slot depth are equal to 0.6L and the As/Af ratio is equal to 0.75. Core elements having dimensions which deviate from the hereinabove described maximum will function with lower efficiency. It is recommended, however, that core elements be designed to have no less than 70% of the optimum power capacity possible given the volume of the core element. In the case of such a "70%" core element, the sum of the slot widths per pole would equal between approximately and low coercivity. Typical prior art materials have resistivities of about 45 to about 160 microhms/cm. The high resistivity possessed by such alloys minimizes eddy current losses which reduce the core losses. Similarly, the low coercivity of these alloys also reduces hysteresis losses. While such alloys have not been available for use in radial field machines due to the practical forming problems associated with stamping the same or even obtaining them in a form suitable for stamping, these alloys are available in strip or tape form and hence are suitable for winding to form the core configurations required by the present invention.

Additionally, amorphous magnetic alloys, again depending on the composition thereof, exhibit high tensile strength, typically about 2,000,000 to about 6,000,000 psi. This is to be compared with polycrystalline alloys which are used in the annealed condition and which usually range from about 40,000 to 80,000 psi. A high tensile strength is an important consideration in applications where high centrifugal forces are present such as experienced by the cores of motors and generators.

A further advantage of using an amorphous alloy to form the core elements 21 and 41 is that lower coercive forces are obtained than with prior art compositions of substantially the same metallic content thereby permitting more iron, which is relatively inexpensive, to be utilized in the core elements 21 and 41 as compared with a greater proportion of nickel which is more expensive.

Amorphous alloys which possess the advantages described hereinabove may be at least 50% amorphous such as determined by x-ray diffraction techniques. Such alloys include those having the formula:

$$M_{60-90}T_{0-15}X_{10-25};$$

wherein M is at least one of the elements iron, cobalt or nickel; T is at least one of the transition metal elements; and X is at least one of the metalloid elements of phosphorous, boron and carbon. Up to 80% of the carbon, phosphorous and/or boron in X may be replaced by aluminum, antimony, beryllium, germanium, indium, silicon and tin. When used as cores of magnetic devices, such amorphous alloys evince generally superior properties as compared to the conventional polycrystal and metal alloys commonly utilized. Superior results will be obtained with amorphous alloys which are in the range of 80% amorphous with even better results obtained with amorphous alloys which are in the range of 95% amorphous.

The amorphous magnetic alloys of which the core elements 21 and 41 are preferably composed are formed by cooling a melt at approximately $10^5$ C. per second to approximately $10^6$ C. per second. A variety of well known techniques are possible for fabricating a rapidly quenched continuous strip. When used in magnetic cores for electromagnetic induction devices, these strips typically have the form of a ribbon. The strips are conventionally prepared by casting molten metal directly onto a chill surface or onto a quenching medium of some sort. Such processing techniques considerably reduce the cost of fabrication since no intermediate wire drawing or ribbon forming procedures are required.

The cylindrical configuration of the core elements forming the rotor and the stator of the subject invention are well suited to the utilization of such amorphous metal alloys since once the ribbon is wound into a cylindrical configuration the slots can be milled on the annular surface thereof. However, while the amorphous metal alloys herein described may be relied upon to further enhance the efficiency of the instant invention due to the marked reduction in eddy current and hysteresis losses exhibited by core elements formed of these materials, the threshold design parameters for the axial field electrical devices such as the axial motors described above turn upon the efficiency obtained in terms of power capacity per unit volume when certain ratios in the design of such devices are observed. The first ratio which must be observed in the design being implemented is an area ratio and results from a finding that maximum power capacity per unit volume occurs when the total slot area of the electrical device is equal to 75% of the iron area.

This relationship pertains regardless of the inside and outside diameters selected for the core or the axial length thereof. A second ratio is linear and involves the axial dimension in that it requires that the slot depth be equal to 60% of the axial length. The third ratio is circumferential and requires that the sum of the slot widths per pole be equal to 60% of the stator length.

In implementing a design for an axial field electrical device according to the teachings of the instant invention the outside diameter D, the inside diameter d and the axial length L are first selected. Thereafter, the design for the slots of the device are implemented in the manner defined by the three ratios set forth above. In the development of these ratios and in determining the efficacy thereof anent the enhanced efficiency obtained it was assumed that the rotor is configured as a mirror image of the stator in that the rotor is designed to have the same slot depth T and length as the stator. These assumptions are, in any event, perferably employed in the selection of initial values. Furthermore, since the assumption is accurate for wound rotors as well as for "cage" rotors employing aluminum spiders such design considerations would be maintained in the assumed form and would reflect in the ultimate design.

For wound rotors, the rotor is wound in a manner which is highly reminiscent of the manner in which the stator is wound and the connections therefor are brought out by slip rings to rheostats. Wound rotors are preferred when, for example, control of starting and maximum torque is desired. Since both the stator and the rotor use insulated copper wire on insulated slots they have about the same space factor and hence will share the total slot space equally. Similarly, when a "cage" rotor employing an aluminum spider is employed, approximately the same slot space is required as above since while the aluminum spider will exhibit greater space utilization, the higher resistivity thereof will mandate that a rotor configured in this manner employ at least 48% of the slot space leaving 52% thereof for the stator.

Hence in this case too approximately equal sharing of the total slot space for the stator and rotor occur. However, when a "cage" rotor is designed utilizing a copper spider, a much higher packing factor for the rotor is introduced since the same is solid and uninsulated and has much greater space utilization than could possibly occur when a wire wound stator is present. Under these conditions, it has been found that the copper spider need occupy only approximately 30% of the total slot space thus leaving 70% for the stator. Under these conditions, appropriate modification to accommodate optimum slot space sharing between the rotor and stator is appropriate.

Additionally, it will also be appreciated by those of ordinary skill in the art that rotor mass and inertia may be reduced by introducing a second gap associated with the return path of the rotor which may then be utilized in a stationary configuration so that essentially only the slotted portion of the rotor in which the spider is mounted is employed in a rotational mode. These forms of modifications are described in greater detail in connection with FIGS. 5A–5D and FIG. 6A and 6B.

Figure 5A:
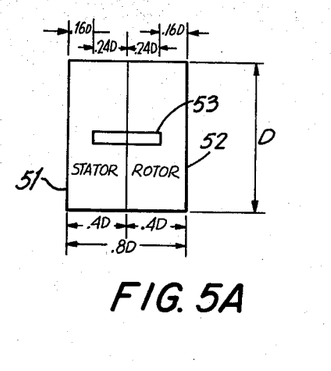
FIG. 5A shows exemplary stator and rotor structure for an electrical device having winding configurations having similar space utilization and/or packing factors.

Referring now to FIGS. 5A–5D, there are shown additional exemplary embodiments of axial field electrical devices in accordance with the present invention. More particularly, FIG. 5A illustrates an exemplary stator and rotor structure for an axial field electrical device employing either a wound rotor or a "cage" rotor employing an aluminum spider. As illustrated in FIG. 5A, the axial field device depicted employs a stator 51 and rotor 52 wound in a core configuration having an outer diameter D as to each of the core configurations illustrated in FIGS. 5A–5D.

The total width of the electrical device illustrated in FIG. 5A, as specified in terms of its outer diameter D is, as plainly indicated in FIG. 5A, 0.8D wherein both the stator 51 and rotor 52 are of equal axial length as specified in FIG. 5A as 0.4D. The electrical device illustrated in FIG. 5A may be viewed as a four pole, three phase device having a ratio of inner to outer diameter (d/D) equaling approximately 0.426.

In this device, a single slot 53 is indicated and as dimensionally shown in FIG. 5A, both the stator 51 and rotor 52 share the slot space equally as dimensionally indicated by the dimensions 0.24D and each has an equal return path space in the axial direction as indicated by the dimension 0.16D. Thus the axial field electrical device illustrated in FIG. 5A may be viewed as dimensionally representing typical dimensions for a stator and rotor in a motor design employing a wound rotor since under these circumstances both stator and rotor would employ insulated copper wire on insulated slots so that they would have approximately the same space factor and would require substantially equal sharing of the slot space.

Similarly, the configuration illustrated in FIG. 5A would also be suitable for a "cage" rotor using an aluminum spider since the higher resistivity thereof would mandate that the rotor occupy approximately 48% of the slot space leaving the remaining 52% thereof for the stator and hence the approximate equal use of the slot space by the stator 51 and rotor 52 as depicted in FIG. 5A would also be appropriate therefor.

Figure 5B:
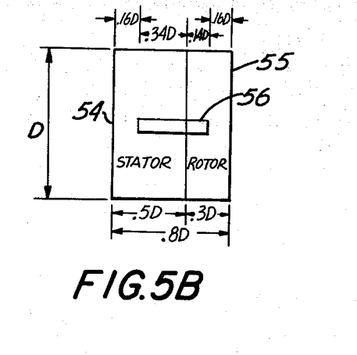
FIG. 5B shows exemplary stator and rotor structure for an electrical device wherein the winding configuration of the rotor exhibits greater space utilization and/or packing factors than those of the stator.

FIG. 5B shows an exemplary stator and rotor structure for an electrical device wherein the winding configuration of the rotor exhibits greater space utilization and/or a greater packing factor than that of the stator. More particularly, the exemplary configuration illustrated in FIG. 5B is set forth to illustrate an exemplary configuration for an axial field device of a "cage" rotor design employing a copper spider or the like. The copper spider, it will be recalled, has a much higher packing factor since it is both solid and uninsulated and does not exhibit the resistance of aluminum. Thus, where this type of spider is employed, it has been found that the spider need only occupy approximately 30% of the total slot space leaving 70% of the slot space for the rotor. Thus, in FIG. 5B, an axial field electrical device of the type described herein is illustrated which has an outer dimension D as well as the same inner diameter to outer diameter ratio as was described in FIG. 5A.

The axial length of the electrical device illustrated in FIG. 5B, as specified as a function of the outer diameter D, is also 0.8D as was also the case in FIG. 5A, however, the stator 54 now exhibits an axial length of 0.5D while the rotor 55 exhibits an axial length of 0.3D all as illustrated in FIG. 5B. The axial field device illustrated in FIG. 5B, as plainly indicated, retains the same return path for the stator 54 and the rotor 55 as the device illustrated in FIG. 5A since, as will be noted upon an inspection of FIG. 5B, the same is specified as 0.16D in each case. However, the slot space associated with slot 56 has here been varied so that the stator and hence the windings thereof, not shown in FIG. 5B, occupy 0.34 or 70% of the slot space of the slot 56 while the copper spider of the rotor 55 only occupies 0.14D or 30% of the slot space.

Figure 5C:
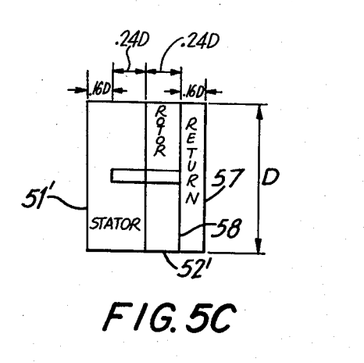
FIGS. 5C and 5D depict modified versions of the embodiments of the invention illustrated in FIGS. 5A and 5B wherein an additional air gap is introduced for purposes of lowering rotor inertia.
Figure 5D:
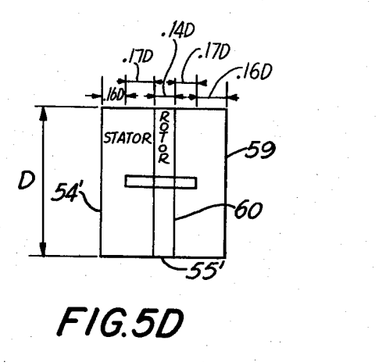

Thus, FIG. 5D illustrates the manner in which the slot space would be divided in a motor designed in accordance with the principles of the instant invention employing a copper spider so that the assignment of slot space for the windings of the stator 54 and the rotor 55 are divided in a manner to accommodate the unequal packing factor between the insulated copper windings of the stator and the solid, uninsulated copper spider employed for the rotor.

FIGS. 5C and 5D depict modified versions of the embodiments of the invention illustrated in FIGS. 5A and 5B, respectively, wherein an additional air gap is introduced for purposes of lowering rotor inertia. The axial field electric devices illustrated in FIGS. 5A and 5B may be provided with an extra air gap separating the working portion of the rotor from its attached flux return path so that the mass of the rotating rotor and hence the inertia thereof is reached. This may be done by locating the rotor between two halves of the stator or alternatively, at one extreme end in which case the return path, which is stationary, has no slots and comprises a plain wound core. Thus, in FIG. 5C, the stator 51' takes the precise form employed in FIG. 5A. However, the rotor 52' has had the 0.16D return path portion 57 separated from the rotating rotor by a air gap 58. The return portion 57 is now stationary, has no slots and may take the form of a plain wound core of the same material as provided for the core of the stator or rotor.

Alternatively, as shown in FIG. 5D which is a modified version of the electrical device illustrated in FIG. 5B, the rotor may be sandwiched between two portions of the stator. Under these circumstances and noting that FIG. 5D is a modified version of the axial field device illustrated in FIG. 5B, it will be seen that the stator 54' has been reduced by one-half the slot portion previously occupied thereby as illustrated in FIG. 5B. The rotor 55' has been reduced to be limited only to the portion thereof shown in FIG. 5B associated with slot space for the spider thereof and a new stator 59 is created by establishing a gap 60, the stator being formed of one-half the axial length previously occupied by the stator 54 in FIG. 5B and the return path of 0.16D previously needed for the rotor shown in FIG. 5B. Thus, in the embodiment of the invention illustrated in FIG. 5B the rotor and its attendant mass and inertia have been reduced to the extent limited by the length of slot space necessary for the same to occupy and its independent return path has been removed. In lieu of this, a second, symmetrical stator has been created from one-half the slot space previously occupied by the stator 54 in FIG. 5B and the return path originally provided for rotor 55 so that the rotor 55' of the embodiment illustrated in FIG. 5D is now sandwiched between a pair of stators 54' and 59.

The advantages gained by the modified embodiments of the invention illustrated in FIGS. 5C and 5D are that through the utilization of the extra gap 58 and 60, in each case, a lowering of the rotor mass and hence the inertia thereof is obtained since the return path is now stationary. There is an important disadvantage, however, in that the magnetizing current needed to conduct flux is now doubled. This will increase the stator losses and lower the power factor of the motor. It should also be noted that while one form of modification for each of the devices illustrated in FIGS. 5A and 5B has been illustrated in FIGS. 5C and 5D, respectively, the modified version of the invention illustrated in FIG. 5C could readily be applied to the embodiment illustrated in FIG. 5B and, conversely, the form of modification employed in connection with FIG. 5D may be readily adopted to the embodiment of the invention shown in FIG. 5A.

While the advantages gained in the embodiments of the invention illustrated in FIGS. 5C and 5D through a lowering of the rotor mass and inertia via the provision of an extra gap are highly desirable, the attendant disadvantage associated with a doubling of the magnetizing current, the increase in stator losses and the lowering of the power factor are not advantageous. However, it has been found that the advantages obtained through the use of an additional gap can be retained without the attendant disadvantages thereof through a further modification of structure in the manner illustrated in connection with FIG. 6A and FIG. 6B.

Figure 6A:
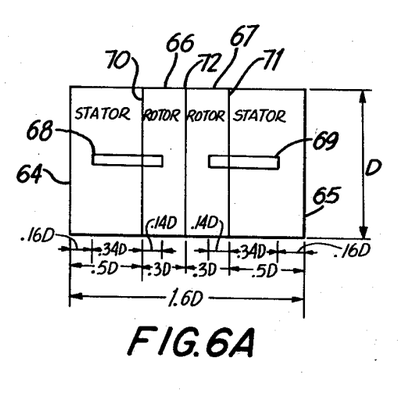
FIG. 6A shows an arrangement of two single gap electromagnetic devices of the type illustrated in FIG. 5B
Figure 6B:
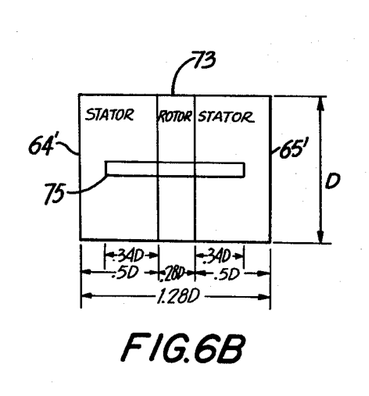
FIG. 6B shows a modified version of the electromagnetic device depicted in FIG. 6A which further improves the efficiency of electrical devices configured in accordance with the teachings of the present invention.

Referring now to FIG. 6A and 6B, there is shown additional exemplary embodiments of the present invention wherein FIG. 6A shows an arrangement of two single gap electrical devices of the type illustrated in FIG. 5B and FIG. 6B shows a modified version of the structure shown in FIG. 6A which further improves the efficiency of the electrical devices configured in accordance with the teachings of the present invention. More particularly, FIG. 6A illustrates an axial field device which is simply formed of two single gap devices of the type illustrated in FIG. 5B which have been placed back-to-back. Thus, as shown in FIG. 6A an axial field device having an outer diameter D is formed having a pair of stators 64 and 65 and a pair of internal rotors 66 and 67. Each stator 64 and 65 and rotor 66 and 67 is configured in the manner of the stator and rotor illustrated in FIG. 5B in that the device has an overall axial length of 1.6D, each stator having an axial length of 0.5D while each rotor has an axial length of 0.3D. A pair of slots 68 and 69 are also provided in the manner shown in FIG. 5B so that the stator windings may utilize 0.34D or 70% thereof while the solid copper spider of the rotor only occupies 0.14D or 30% of the slot space as plainly indicated in FIG. 6A.

As the embodiment illustrated in FIG. 6A comprises two single gap machines as illustrated in FIG. 5B which have been placed back-to-back, the magnetic circuits thereof are independent and while the power capacity has now been doubled, so has the volume. In addition, the axial field device behaves as a single gap machine since each stator winding supplies one gap 70 and 71 and each of the rotors 66 and 67 retains the same size return path, i.e., 0.16D as was illustrated therefor in FIG. 5B.

Referring now to FIG. 6B, there is shown a modified version of the electrical device depicted in FIG. 6A which further improves the efficiency of the electrical devices configured in accordance with the teachings of the present invention in that power capacity per unit volume is increased over the embodiment illustrated in FIG. 6A while the disadvantages attending a requirement for increased magnetizing current, as described in association with FIGS. 5C and 5D, is avoided. More particularly, as shown in the embodiment illustrated in FIG. 6B, the stators 64' and 65' are retained in the same form as was illustrated for stators 64 and 65 in connection with FIG. 6A. However, the same are oppositely poled so that return path fluxes cancel one another out. Under these circumstances, the return path portions of each of the rotors 66 and 67 shown in FIG. 6A may be omitted from the embodiment illustrated in FIG. 6B, so that only the working portions of each rotor, i.e. that associated with the slot space is retained and these two working portions may be joined in the manner illustrated for the rotor 73 in FIG. 6B. Thus, it will be seen that the embodiment of the invention illustrated in FIG. 6B is reduced in volume due to the omission of the two 0.16D rotor return path portions and only a single slot 75 having a length of 0.96D need be provided. Thus, with the embodiment of the invention illustrated in FIG. 6B, a marked reduction in rotor mass and inertia is obtained by the provision of an extra gap while no increase in magnetizing current is required. Thus, stator losses are not increased prior is the power factor of the motor increased.

Various changes and omissions can be made without departing from the spirit and scope of the invention. For instance, although the illustrated embodiments depict rotors employing shorted conductors in the form of a one piece cast spider, it is understood that the spider could be formed from a plurality of stacked stampings. Additionally, although not illustrated, the subject invention is equally applicable to a wound rotor employing windings, a slip ring and resistors as is well known in the art. The stators depicted have been described as including twelve slots and windings disposed within the slots so that the device can be powered by a three-phase power source. As can well be appreciated, other slot and winding configurations than herein described could be utilized depending upon the number of phases, poles, etc. While the preferred embodiments set forth herein are disclosed in terms of 4-pole motors, it will be appreciated by those of ordinary skill in the art that the concepts herein are equally applicable to other electromagnetic devices such as generators or the like and that any number of poles for such electromagnetic devices may be employed. Therefore, the invention set forth herein should be viewed as only limited by the claims set forth hereinafter.

What is claimed is:

1. In an axial field electromagnetic device including a rotor and a stator formed of core elements that delimit a selected number of poles, the improvement comprising:

a core element in the form of a cylinder having an annular cross section and two opposed annular core faces at either end thereof, said cylinder having an axial thickness (L) separating said faces and a plurality of radial slots disposed in one of said faces, each of said slots having a width (W), a depth (T) and a slot area (slot width times slot length), said slotted face having a face area ($A_f$) equal to the difference between the annular cross-sectional area of said core and the total of said slot areas, said radial slots being sized such that the sum of said slot widths per hole is between approximately 30% to approximately 90% of said axial thickness, said slot depth is between approximately 45% to approximately 75% of said axial thickness and the total of said slot areas is between approximately 27% to approximately 180% of said remaining face area ($A_f$).

2. The improved electromagnetic device of claim 1 wherein said slots have a slot width sized such that the sum of said slot widths per pole is between approximately 35% to approximately 85% of said axial thickness, a slot depth of between approximately 48% to approximately 72.5% of said axial thickness and a total slot area of between approximately 34% to approximately 158% of the difference between the annular cross sectional area of one of said core elements and said total slot area.

3. The improved electromagnetic device of claim 2 wherein said slots have a slot width sized such that the sum of said slot widths per pole is between approximately 41% to approximately 77% of said axial thickness, a slot depth of between approximately 50.5% to approximately 68.7% of said axial thickness and a total slot area of between approximately 41% to approximately 123% of the difference between the annular cross sectional area of said core elements and said total slot area.

4. The improved electromagnetic device of claim 3 wherein said slots have a slot width sized such that the sum of said slot widths per pole is approximately 60% of said axial thickness, a slot depth of approximately 60% of said axial thickness and a total slot area of approximately 75% of the difference between the annular cross sectional area of said core element and said total slot area.

5. The improved electromagnetic device of claim 1 wherein said core element is formed from a spirally wound strip of magnetically permeable material having a width equal to the axial thickness of said core element.

6. The improved electromagnetic device of claim 5 in which said strip is composed of a metal alloy that is at least 50% amorphous and has a composition defined by the formula $M_{60-90}T_{0-15}X_{10-15}$ wherein M is at least one of the elements of iron, cobalt and nickel, T is at least one of the transition metal elements and X comprises a metalloid element selected from the group consisting of phosphorus, boron, carbon and mixtures thereof.

7. The improved electromagnetic device of claim 6 in which up to 80% of component X further comprises a metal element selected from the group consisting of aluminum, antimony, beryllium, germanium, indium, silicon, tin and mixtures thereof.

8. The improved electromagnetic device of claim 6 in which said strip is at least 80% amorphous.

9. The improved electromagnetic device of claim 6 in which said strip is at least about 95% amorphous.

10. An axial field electromagnetic device, comprising:
 a frame;
 rotor means rotatably mounted on said frame, said rotor means including a first core element in the form of a cylinder having an annular cross section and two opposed annular faces at either end thereof, said first core element having a first axial thickness separating said faces, a first outer diameter, a first inner diameter, a first plurality of radial slots in one of said faces, and a plurality of windings disposed within said slots, each of said slots having a slot width, a slot depth and a slot area (slot width times slot length), said slotted face having a face area ($A_f$) equal to the difference between the annular cross-sectional area of said core and the total of said slot areas, said slots being sized such that the sum of said slot widths per pole is between approximately 30% to approximately 90% of said first axial thickness, said slot depth is between approximately 45% to approximately 75% of said axial thickness and the total of said slot areas is between approximately 27% to approximately 180% of said remaining face area ($A_f$); and
 stator means attached to said frame and displaced from said rotor means to form an air gap therebetween, said stator means including a second core element in the form of a cylinder having a second annular cross section and two opposed annular faces at either end thereof, a second axial thickness; a second outer diameter, a second inner diameter, a second plurality of radial slots in one of said faces of said second core element and a plurality of conductor means disposed within said slots.

11. The electromagnetic device of claim 10 wherein said slots of said first core element have a slot width sized such that the sum of said slot widths per pole equals between approximately 35% to approximately 85% of said first axial thickness, a slot depth of between approximately 48% to approximately 72.5% of said first axial thickness and a total slot area between approximately 34% to approximately 158% of the difference between the annular cross sectional area of said first core element and said total slot area.

12. The electromagnetic device of claim 11 wherein said slots of said first core element have a slot width sized such that the sum of said slot widths per pole is between approximately 41% to approximately 77% of said first axial thickness, a slot depth of between approximately 50.5% to approximately 68.7% of said first axial thickness and a total slot area of between approximately 41% to approximately 123% of the difference between the annular cross sectional area of said first core element and the total slot area.

13. The electromagnetic device of claim 12 wherein said slots of said first core element have a slot width sized such that the sum of the slot widths per pole is approximately 60% of said first axial thickness, a slot depth of approximately 60% of said first axial thickness and a total slot area of about 75% of the difference between the annular cross sectional area of said first core element and said total slot area.

14. The electromagnetic device of claim 10 wherein said second outer diameter, said second inner diameter and said second axial thickness are all equally sized with the corresponding dimensions of said first core element and wherein said slots of said second core element have a slot width size such that the sum of said slot widths per pole equals between approximately 30% to approximately 90% of said second axial thickness, a slot depth of between approximately 45% to approximately 75% of said second axial thickness and a total slot area of between approximately 27% to approximately 180% of the difference between the annular cross sectional area of said second core element and said total slot area.

15. The electromagnetic device of claim 11 wherein said second axial thickness, said second outer diameter and said second inner diameter are all equally sized with the corresponding dimensions of said first core element and wherein said slots of said second core element have a slot width sized such that the sum of the slot widths per pole is between approximately 35% to approximately 85% of said second axial thickness, a slot depth of between approximately 48% to approximately 72.5% of said second axial thickness and a total slot area of between approximately 34% to approximately 158% of the difference between the annular cross sectional area of said second core element and said total slot area.

16. The electromagnetic device of claim 12 wherein said second axial thickness, said second outer diameter and said second inner diameter are all equally sized with the corresponding dimensions of said first core element and wherein said slots of said second core element have a slot width sized such that the sum of the slot widths per pole is between approximately 41% to approximately 77% of said second axial thickness, a slot depth of between approximately 50.5% to approximately 68.7% of said second axial thickness and a total slot area of between approximately 41% to approximately 123% of the difference between the annular cross sectional area of said second core element and said total slot area.

17. The electromagnetic device of claim 13 wherein said second axial thickness, said second outer diameter and said second inner diameter are all sized equally with the corresponding dimensions of said first core element and wherein said slots of said second core element have a slot width sized such that the sum of said slot widths per pole is approximately 60% of said second axial thickness, a slot depth of approximately 60% of said second axial thickness and a total slot area of approximately 75% of the difference between the annular cross sectional area of said second core element and said total slot area.

18. The electromagnetic device of claim 17 wherein said rotor means is provided with a greater number of slots than said stator means.

19. The electromagnetic device of claim 18 wherein said rotor means is provided with fourteen slots and said stator means is provided with twelve slots.

20. The electromagnetic device of claim 10, wherein said core elements are formed from a spirally wound strip of magnetically permeable material having a width equal to the axial thickness of said core elements.

21. The electromagnetic device of claim 20 in which said strip is composed of a metal alloy that is at least 50% amorphous and has a composition defined by the formula $M_{60-90} T_{0-15} X_{10-15}$ wherein M is at least one of the elements of iron, cobalt and nickel, T is at least one of the transition metal elements, and X comprises a metalloid element selected from the group consisting of phosphorus, boron, carbon and mixtures thereof.

22. The electromagnetic device of claim 21 in which up to 80% of component X further comprises a metal element selected from the group consisting of aluminum, antimony, beryllium, germanium, indium, silicon, tin and mixtures thereof.

23. The electromagnetic device of claim 21 in which said strip is at least 80% amorphous.

24. The electromagnetic of claim 21 in which said strip is at least about 95% amorphous.

25. In an axial field electromagnetic device including rotor means and stator means, the improvement comprising each of said rotor means and stator means being formed of a core element in the form of a cylinder having an annular cross section and two opposed annular faces at either end thereof, each core element having an axial thickness separating said faces and a plurality of radial slots disposed in at least one of said annular faces thereof, each of said slots having a width (W), a depth (T) and a slot area (slot width times slot length), each of said slotted faces having a face area ($A_f$) equal to the difference between the annular cross-sectional area of said core and the total of said slot areas, and said plurality of radial slots in each slotted core element face having a total slot area ranging between approximately 27% to approximately 180% of said remaining face area ($A_f$).

26. The improved axial field electromagnetic device according to claim 25 wherein said plurality of radial slots in each core element exhibits a slot width sized such that the sum of the slot widths per pole for each core element is approximately 30% to 90% of a value corresponding to one-half the value of the sum of the axial thickness of each of said core elements.

27. The improved axial field electromagnetic device according to claim 26 wherein said plurality of radial slots in each core element exhibits a slot depth of between 45% to 75% of a value corresponding to one-half the value of the sum of the axial thickness of each of said core elements.

28. The improved axial field electromagnetic device according to claim 27 wherein said plurality of radial slots in each core element have a total area between approximately 34% to 158% of the difference between the annular cross-sectional area of said core element and said total slot area.

29. The improved axial field electromagnetic device according to claim 28 wherein said plurality of radial slots in each core element have a total area of approximately 75% of the difference between the annular cross-sectional area of said core element and said total slot area.

30. The improved axial field electromagnetic device according to claim 25 additionally comprising:
  winding means selectively disposed about said core element of said stator means and through said plurality of radial slots therein, said winding means exhibiting a first space factor regarding efficiency of use of slot space within said core element of said stator means; and
  conductor means selectively disposed about said core element of said rotor means and through said plurality of radial slots therein, said conductor means exhibiting a second space factor regarding efficiency of use of slot space within said rotor means.

31. The improved axial field electromagnetic device according to claim 30 wherein said second space factor of said conductor means is greater than said first space factor of said winding means.

32. The improved axial field electro-magnetic device according to claim 30 wherein said conductor means takes the form of spider means having an annular portion disposed to fit peripherally about a portion of said core element of said rotor means containing said plurality of radial slots, and a plurality of depending spoke members disposed to fit within said plurality of radial slots of said rotor means, said spider means acting as a plurality of shorted conductors for winding said rotor means.

33. The improved axial field electromagnetic device according to claim 32 wherein said second space factor of said conductor means is greater than said first space factor of said winding means.

34. The improved axial field electromagnetic device according to claim 33 wherein said axial thickness of said core element of said stator means and said axial thickness of said core element of said rotor means are inversely proportional to said first and second space factors, respectively.

35. The improved axial field electromagnetic device according to claim 30 wherein said core element of said rotor means includes first and second core element portions, said first core element portion containing said plurality of radially disposed slots having said conductor means disposed thereabout and said second core element portion containing a magnetic return path for said first core element portion, said axial field electromagnetic device being configured having said first core element portion of said rotor means mounted for rotation intermediate said stator means and said second core element portion, said stator means and said second core element portion being fixedly disposed and said core element of said stator means being positioned having said annular face containing said plurality of radial slots disposed proximate to said first core element portion.

36. The improved axial field electromagnetic device according to claim 30 wherein said stator means comprises first and second stators disposed on opposite sides of said rotor means, said rotor means being rotatably mounted therebetween, each of said first and second stators being formed of a core element in the form of a cylinder having an annular cross section and two opposed annular faces at either end thereof, each core element having an axial thickness separating said faces and having a plurality of radial slots disposed in one of said annular faces thereof proximate to said rotor means, each core element of said first and second stators having winding means selectively disposed thereabout and through said plurality of radial slots therein.

37. The improved axial field electromagnetic device according to claim 36 wherein said conductor means takes the form of spider means having an annular portion disposed to fit peripherally about a portion of said core element of said rotor means containing said plurality of radial slots, and a plurality of depending spoke members disposed to fit within said plurality of radial slots of said rotor means, said spider means acting as a plurality of shorted conductors for winding said rotor means.

38. The improved axial field electromagnetic device according to claim 37 wherein said second space factor of said conductor means is greater than said first space factor of said winding means.

39. The improved axial field electromagnetic device according to claim 38 wherein said axial thickness of said core elements of said first and second stators are equal and the axial thickness of said core elements of said first and second stators plus a quantity of said axial thickness of said core element of said rotor means minus said quantity are inversely proportional to said first and second space factors, respectively.

40. The improved axial field electromagnetic device according to claim 39 wherein said core element of said rotor means has said plurality radial slots extending therethrough between both opposed annular faces thereof and is not provided with a return path, said quantity being an axial length corresponding to that which would otherwise be occupied by a return path for said rotor means.

41. The improved axial field electromagnetic device according to claim 40 wherein said winding means for each core element for said first and second stators is oppositely poled.

42. The improved axial field electromagnetic device of claim 25, wherein said core elements are formed from a spirally wound strip of magnetically permeable material having a width equal to the axial thickness of said core elements.

43. The improved axial field electro-magnetic device of claim 42 in which said strip is composed of metal alloy that is at least 50% amorphous and has a composition defined by the formula $M_{60-90} T_{0-15} X_{10-15}$ wherein M is at least one of the elements of iron, cobalt and nickel, T is at least one of the transition metal elements, and X comprises a metalloid element selected from the group consisting of phosphorus, boron, carbon and mixtures thereof.

44. The improved axial field electromagnetic device of claim 43 in which up to 80% of component X further comprises a metal element selected from the group consisting of aluminum, antimony, beryllium, germanium, indium, silicon, tin and mixtures thereof.

45. The improved axial field electromagnetic device of claim 43 in which said strip is at least 80% amorphous.

46. The improved axial field electromagnetic device of claim 43 in which said strip is at least about 95% amorphous.

* * * * *